US010457221B2

(12) United States Patent
Roberts

(10) Patent No.: US 10,457,221 B2
(45) Date of Patent: Oct. 29, 2019

(54) RAMP SYSTEMS AND METHODS THEREOF

(71) Applicant: Derrick Roberts, Villa Rica, GA (US)

(72) Inventor: Derrick Roberts, Villa Rica, GA (US)

( * ) Notice: Subject to any disclaimer, the term of this patent is extended or adjusted under 35 U.S.C. 154(b) by 0 days.

(21) Appl. No.: 16/115,985

(22) Filed: Aug. 29, 2018

(65) Prior Publication Data

US 2019/0061632 A1  Feb. 28, 2019

Related U.S. Application Data

(60) Provisional application No. 62/605,826, filed on Aug. 29, 2017.

(51) Int. Cl.

| | |
|---|---|
| *E01D 15/12* | (2006.01) |
| *B60R 9/00* | (2006.01) |
| *B60R 9/06* | (2006.01) |
| *A01D 34/00* | (2006.01) |
| *B60R 11/00* | (2006.01) |
| *B60R 11/06* | (2006.01) |

(52) U.S. Cl.
CPC .............. *B60R 9/00* (2013.01); *A01D 34/001* (2013.01); *B60R 9/06* (2013.01); *B60R 11/00* (2013.01); *B60R 11/06* (2013.01); *E01D 15/12* (2013.01); *B60R 2011/004* (2013.01)

(58) Field of Classification Search
CPC ........... B60R 9/00; B60R 9/06; A01D 34/001; E01D 15/12

USPC .......................................................... 14/69.5
See application file for complete search history.

(56) References Cited

U.S. PATENT DOCUMENTS

| 3,510,015 | A  | * | 5/1970  | Roshaven  | B60P 1/435 |
| | | | | | 296/61 |
| 8,127,389 | B1 | * | 3/2012  | Hannam    | B66F 7/243 |
| | | | | | 14/69.5 |
| 8,276,965 | B2 | * | 10/2012 | Turnbow   | B62D 33/02 |
| | | | | | 296/26.1 |
| 2017/0113887 | A1 | * | 4/2017 | Pendleton | B60P 1/43 |

* cited by examiner

*Primary Examiner* — Raymond W Addie
(74) *Attorney, Agent, or Firm* — Gardner Groff & Greenwald, PC

(57) ABSTRACT

A mount for receiving and retaining at least one ramp. The mount includes a first side and a second side. The first side includes a body portion, at least one engagement finger extending in a first direction and at least one engagement finger extending in a second direction. The second side includes a body portion, at least one engagement finger extending in the first direction and at least one engagement finger extending in a second direction. At least one spacer member can be coupled to the body portion of the first and second sides so as to provide at least some spacing between the first side and the second side. The mount can be attached to a wheeled vehicle for removable attachment of one or more ramps thereto. The wheeled vehicle can be a lawn mower.

21 Claims, 14 Drawing Sheets

RAMP SYSTEMS AND METHODS THEREOF

CROSS-REFERENCE TO RELATED APPLICATION

This application claims the benefit of U.S. Provisional Patent Application Ser. No. 62/605,826 filed Aug. 29, 2017, the entirety of which is hereby incorporated herein by reference for all purposes.

TECHNICAL FIELD

The present invention relates generally to the field of portable ramps, and more particularly to ramps and mounting systems for attachment and use with a wheeled vehicle.

BACKGROUND

Wheeled vehicles, especially lawn care equipment such as lawn mowers and tractors, are often required to traverse up and over curbs in order to access grass and work areas (e.g., so that the lawn mower can cut the grass). Jumping curbs or bumping against curbs to traverse up and over curbs causes wear and tear on the vehicle and equipment, often resulting in broken or bent wheels and suspension parts, cracked transmission parts, damaged cutting blades and damage to hydraulics. Typically, wooden boards or other elongate members have been used to assist in traversing curbs, but boards and similar devices often break, slip, are cumbersome, and depend on the worker to use and keep available. Continued improvements to ramps and mounting systems for assisting wheeled vehicles in traversing curbs are sought. It is to the provision of ramp systems and methods thereof meeting these and other needs that the present invention is primarily directed.

SUMMARY

In example embodiments, the present invention provides ramp systems and methods thereof for permitting one or more ramps to be removably attached to a wheeled vehicle. In example embodiments, a mount is provided for attachment to the wheeled vehicle so as to permit removable attachment of the one or more ramps thereto. In example embodiments, the one or more ramps can be provided for assisting the wheeled vehicle in traversing a curb or other elevation change.

In one aspect, the present invention relates to a ramp and mount system including at least one ramp and a mount. The mount includes a vehicle-engagement portion and a ramp-engagement portion. In example embodiments, the vehicle-engagement portion is removably attached to a bracket of a wheeled vehicle and the at least one ramp is configured for removable engagement with the ramp-engagement portion of the mount.

In example embodiments, a pair of ramps are configured for removable engagement with the ramp-engagement portion. In example embodiments, the mount further includes a body portion for generally affixing the vehicle-engagement portion to the ramp-engagement portion. In example embodiments, the mount further includes at least one spacer member for affixing the body portion including a first vehicle-engagement portion and first vehicle-engagement portion with another body portion comprising a second vehicle-engagement portion and a second ramp-engagement portion. In example embodiments, the vehicle-engagement portion includes at least one engagement finger for removable engagement with a portion of the wheeled vehicle. In example embodiments, the vehicle-engagement portion includes a pair of spaced-apart engagement fingers. In example embodiments, the ramp-engagement portion includes at least one engagement finger. In example embodiments, the ramp-engagement portion includes a pair of spaced-apart engagement fingers. In example embodiments, at least a portion of the vehicle-engagement portion is configured for receiving at least one fastener for removable engagement of the vehicle-engagement portion with at least a portion of the wheeled vehicle. In example embodiments, the mount is configured for removably attachment to a bracket or bumper portion of the wheeled vehicle. In example embodiments, the system further includes one or more elastic cords for removably securing the at least one ramp to the mount. In example embodiments, the at least one ramp and mount are formed from a steel or aluminum material.

In another aspect, the invention relates to a mount for receiving and retaining at least one ramp. The mount includes a first side and a second side. The first side having a body portion, at least one engagement finger extending in a first direction and at least one engagement finger extending in a second direction. The second side includes a body portion, at least one engagement finger extending in the first direction and at least one engagement finger extending in a second direction. In example embodiments, at least one spacer member coupled to the body portion of the first and second side so as to provide at least some spacing between the first side and the second side.

In example embodiments, the first side includes at least two engagement fingers extending in the second direction and wherein the second side includes at least two engagement fingers extending in the second direction. In example embodiments, the engagement fingers of the first and second sides that extend in the first direction are configured attachment to at least a portion of a wheeled vehicle. In example embodiments, the wheeled vehicle is a lawn mower. In example embodiments, the engagement fingers extending in the second direction are configured for receiving and removably retaining one or more ramps. In example embodiments, the first and second body portions and the engagement fingers comprise steel. In example embodiments, the first and second body portions and the engagement fingers comprise aluminum.

In still another aspect, the invention relates to a method of traversing a curb with user-accessible ramp system. The method includes providing a wheeled vehicle; providing a mount; providing at least one ramp; removably attaching the mount to the wheeled vehicle; removably attaching the at least one ramp to the mount, moving the wheeled vehicle near a curb, removing the at least one ramp from the mount and setting it between an upper portion of the curb and a ground surface; and moving the wheeled vehicle atop and across the ramp such that the wheeled vehicle traverses the curb.

These and other aspects, features and advantages of the invention will be understood with reference to the drawing figures and detailed description herein, and will be realized by means of the various elements and combinations particularly pointed out in the appended claims. It is to be understood that both the foregoing general Zdescription and the following brief description of the drawings and detailed description of example embodiments are explanatory of example embodiments of the invention, and are not restrictive of the invention, as claimed.

DETAILED DESCRIPTION OF EXAMPLE EMBODIMENTS

Figure 1:
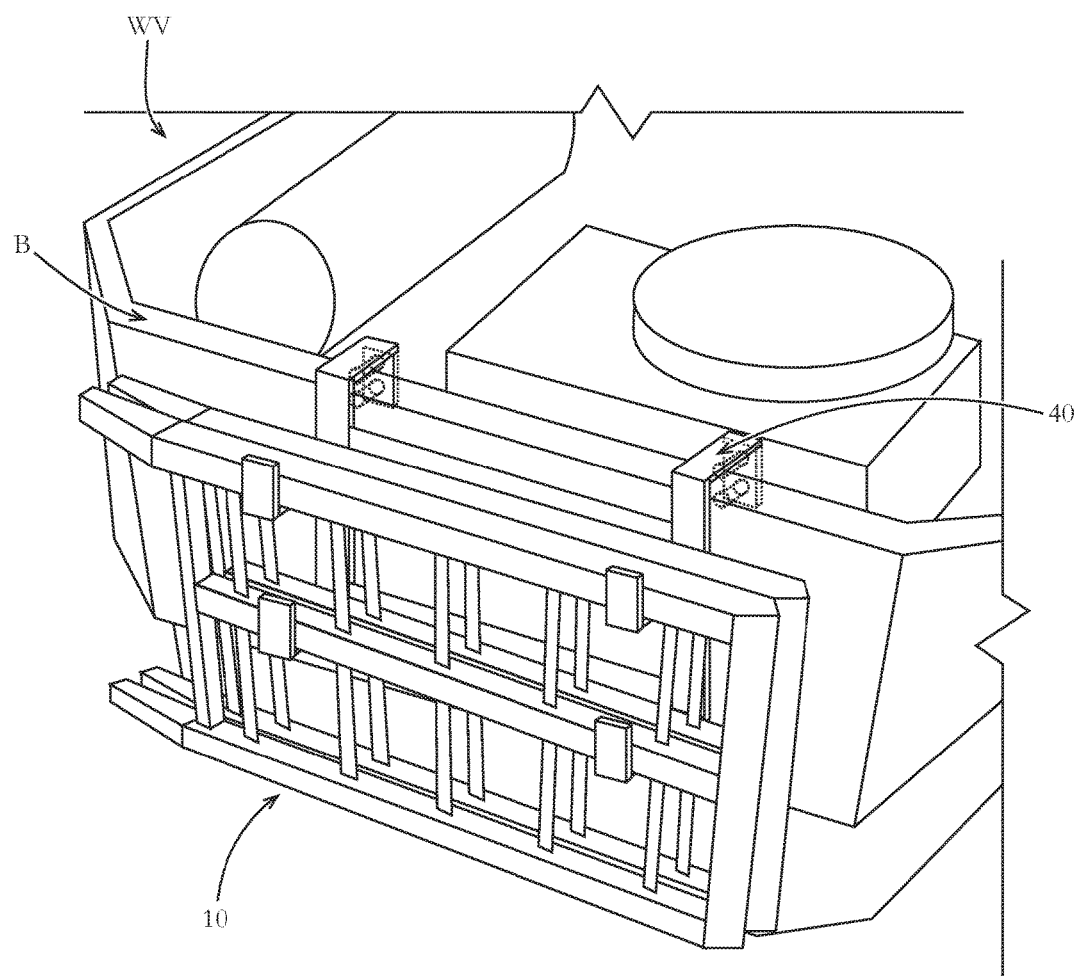
FIG. 1 is a rear perspective view of a wheeled vehicle having mount and a pair of ramps mounted thereto according to an example embodiment of the present invention.

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to the drawing figures, wherein like reference numbers represent corresponding parts throughout the several views, FIGS. 1-5 show a system comprising one or more ramps 10 and a mount 40 for facilitating the removable attachment of the one or more ramps 10 to a wheeled vehicle WV, for example, a lawn mower or other wheeled equipment. In example embodiments, the mount 40 is secured to the wheeled vehicle WV and the one or more ramps 10 are removably engaged with the mount 40. According to one example embodiment, the mount is secured to a rear bumper or bracket portion B of the wheeled vehicle WV, and the one or more ramps 10 are positioned against each other and engage with the mount 40. In preferred example embodiments, the one or more ramps 10 and the mount 40 provide the operator or user of the wheeled vehicle WV with easily accessible and quick solution to assist the wheeled vehicle WV in traversing one or more curbs C. For example, where a curb C surrounds the entirety of a yard or grass area EG that is to be maintained, the one or more ramps 10 can be quickly and easily unmounted from the mount 40 and placed against the curb C (e.g., a generally top surface or upper horizontal surface of the curb C) to facilitate the traversing of the wheeled vehicle over the curb C.

Figure 2:
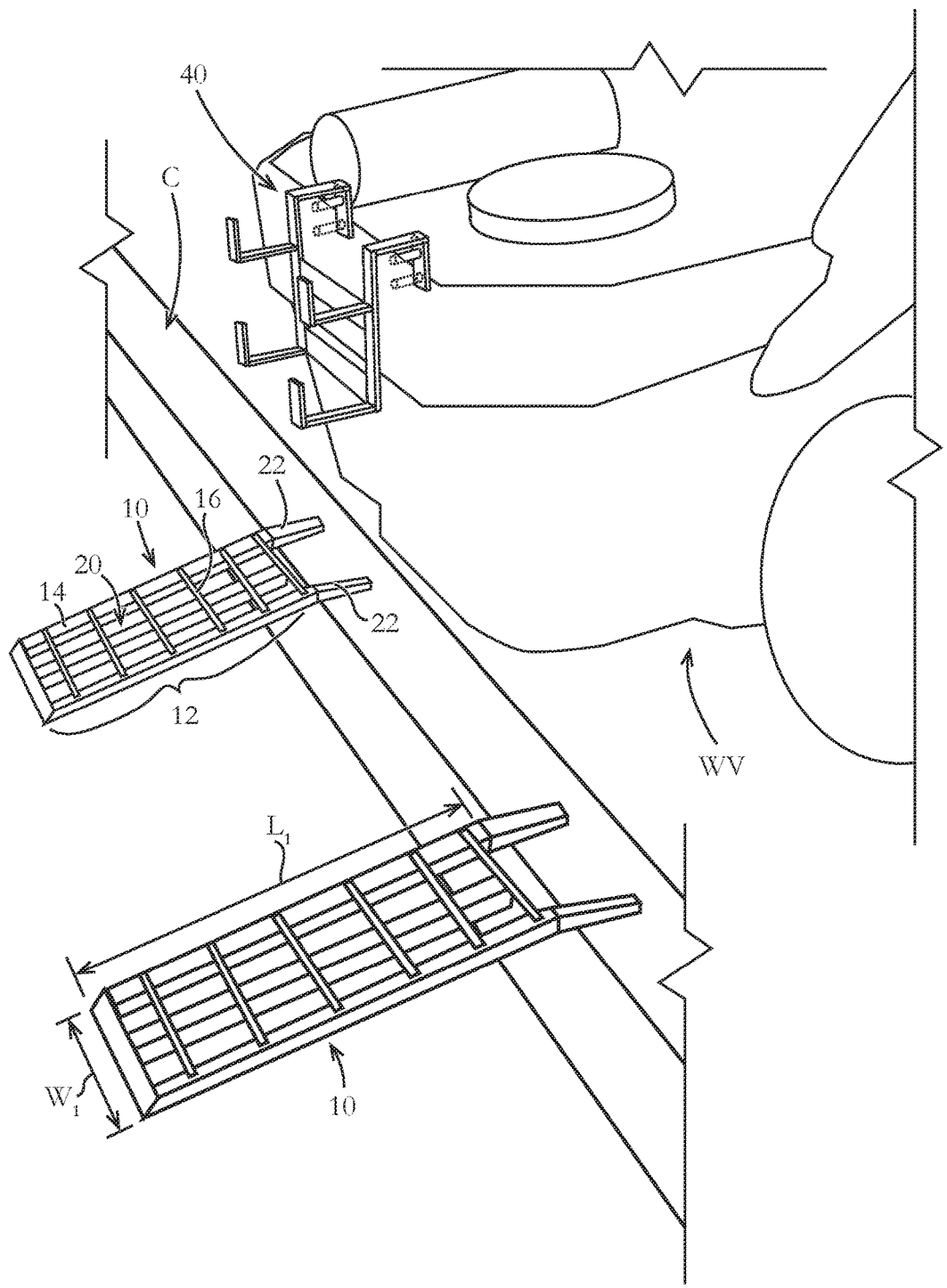
FIG. 2 is a perspective view of the ramps positioned against a curb for assisting the wheeled vehicle of FIG. 1 in traversing a curb to access a grass area.

As depicted in FIG. 2, two ramps 10 are placed against the curb C, for example, to generally match the width of the spaced-apart wheels W of the wheeled vehicle WV. According to one example embodiment, the ramp 10 comprises an elongate body 12 comprising a plurality of spaced-apart elongate members 14, a plurality of transversely-oriented and spaced-apart members 16, and one or more fingers or supportive lip portions 22. In example embodiments, one or more openings 20 are defined between the elongate members 14 and the transversely-oriented members 16, for example, which are utilized for receiving one or more portions of the mount 40 such that the one or more ramps 10 are engagable and supported by the mount 40. According to example embodiments, the ramp 10 comprises a width $W_1$ and a length $L_1$. In example embodiments, the width $W_1$ is generally between about 5-18 inches and the length $L_1$ is between about 10-40 inches. According to one example embodiment, the width $W_1$ is about 11.25 inches and the length $L_1$ is about 18.5 inches. In example embodiments, the supportive lip portions 22 generally extend between about 2-12 inches from the elongate body 12 for engagement with a portion of the curb C.

Figure 4:
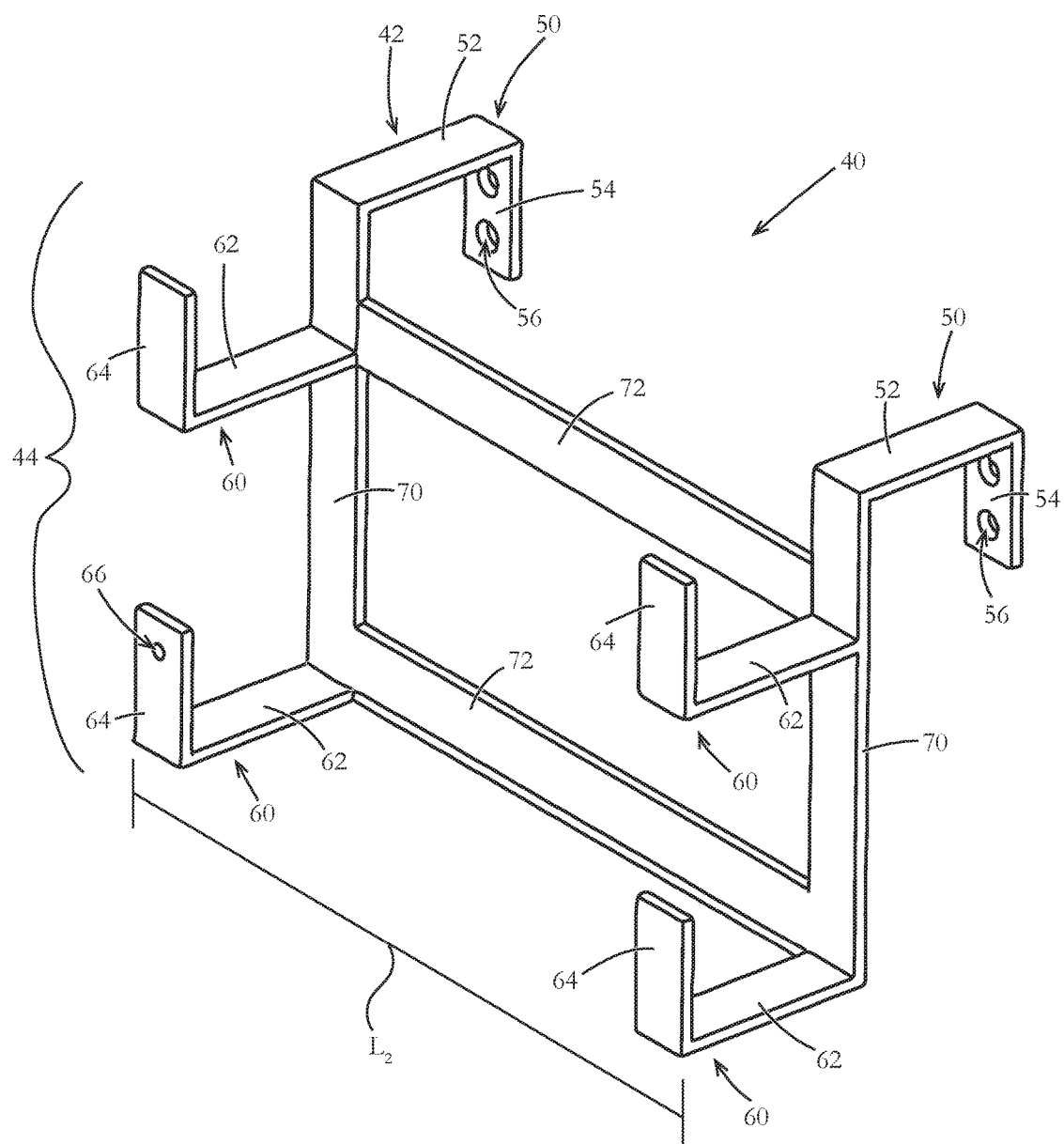
FIG. 4 is a perspective view of the mount of FIG. 1.
Figure 5:
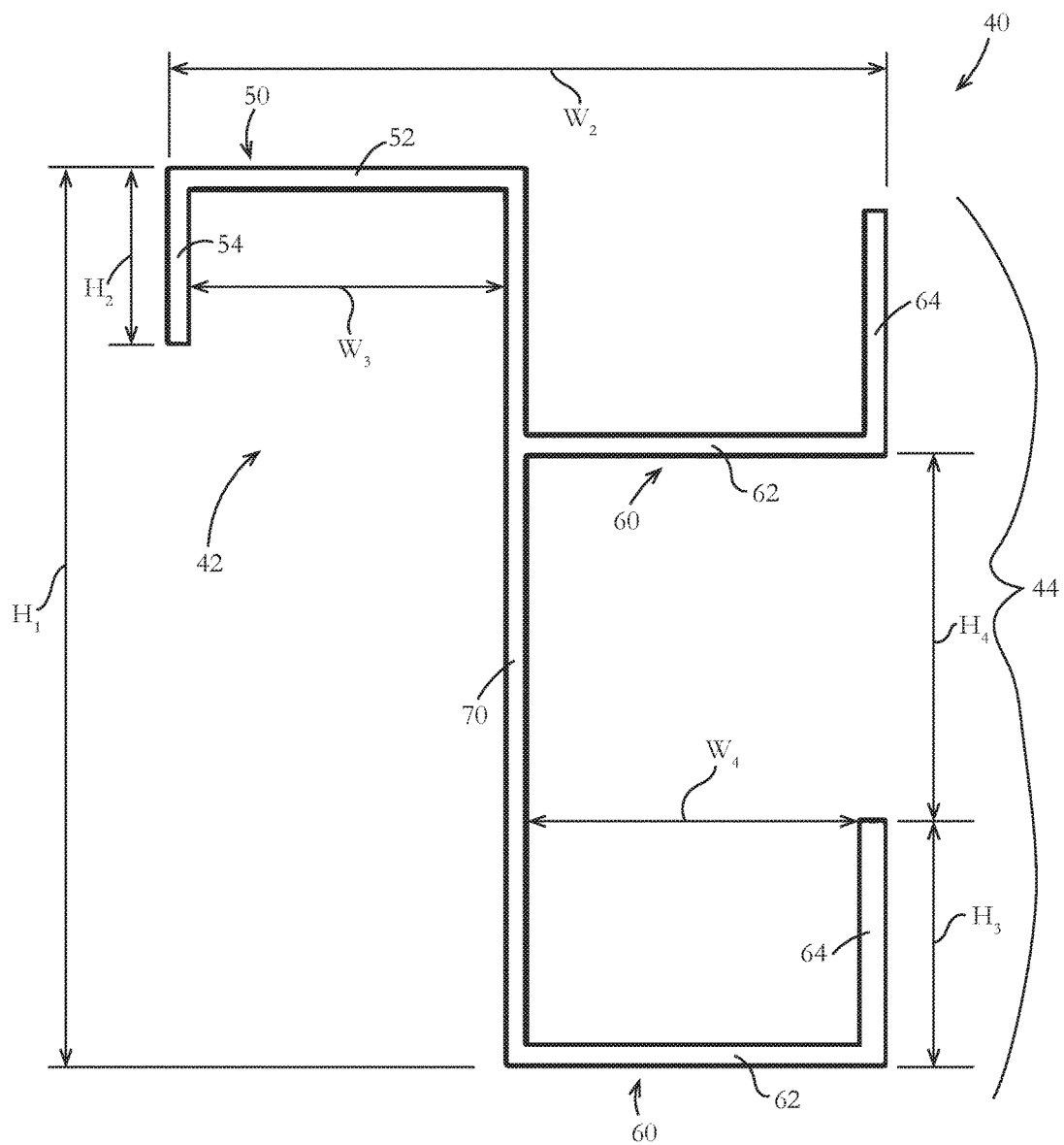
FIG. 5 is a side view of the mount of FIG. 4.
Figure 6:
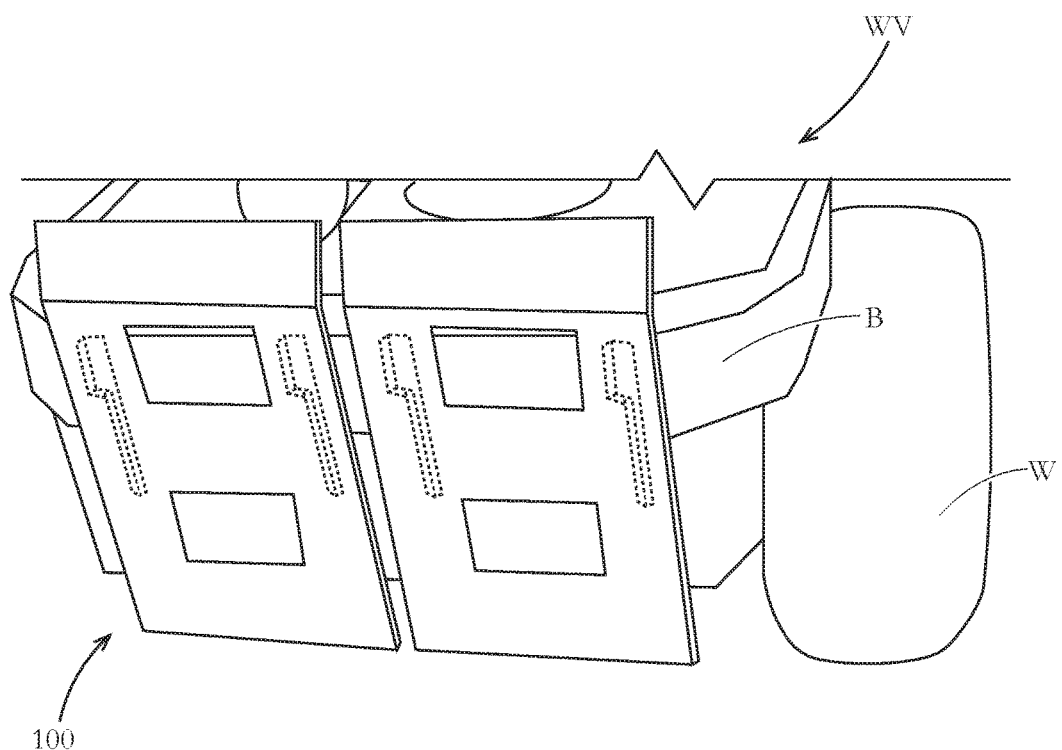
FIG. 6 is a rear view of a wheeled vehicle comprising at least one ramp removably mounted thereto according to another example embodiment of the present invention.

As best shown in FIGS. 4-5, the mount 40 is preferably configured for attachment to the wheeled vehicle WV and for the removable attachment of one or more ramps 10 thereto, for example, such that the user or operator of the wheeled vehicle can easily remove and place the one or more ramps against the curb C, and then move the wheeled vehicle WV across the one or more ramps 10 to traverse the curb C. In example embodiments, the mount 40 generally comprises a vehicle-engagement portion 42 and a ramp-engagement portion 44. In some example embodiments, the mount 40 is configured such that the vehicle-engagement portion 42 extends in a generally opposite direction relative to the ramp-engagement portion 44. For example, according to one example embodiment, the vehicle-engagement portion 42 comprises a pair of spaced-apart engagement hooks or fingers 50, for example, which are generally sized and shaped for engagement with a portion of the wheeled vehicle WV.

Figure 3:
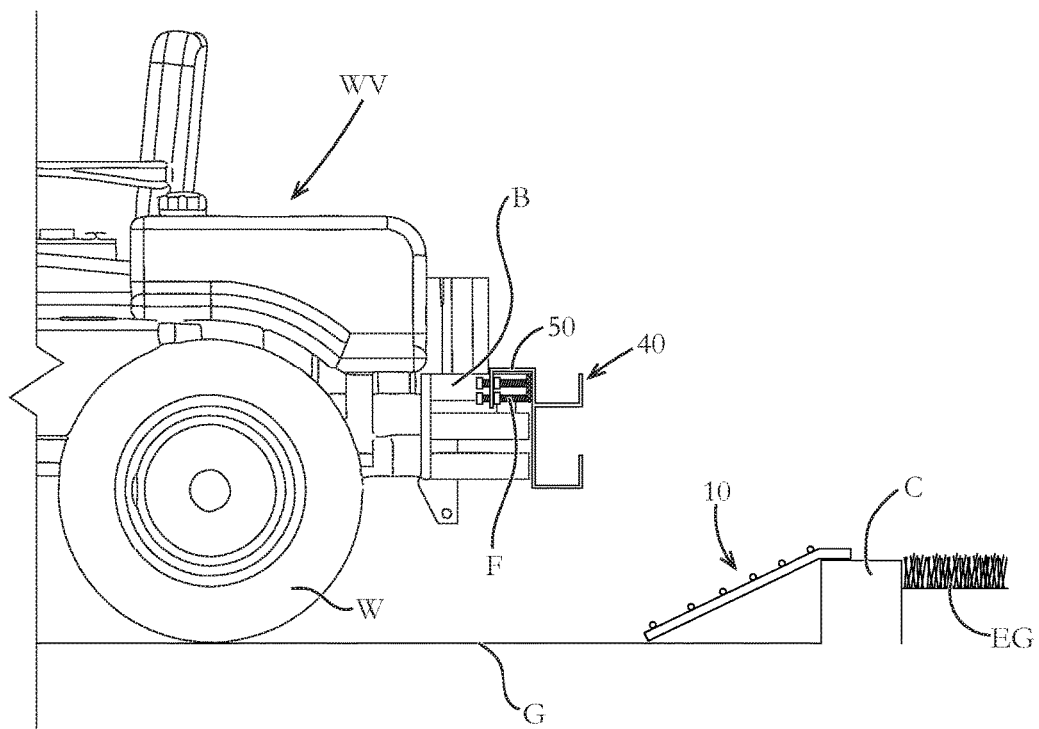
FIG. 3 is a side view of the ramps positioned against the curb of FIG. 2, and showing the wheeled vehicle being positioned on a ground surface that is below the grass area.

As depicted in FIG. 3, one or more fasteners F are engaged with the fingers 50, and with the fingers 50 engaged with the bracket portion B of the wheeled vehicle WV, the fasteners F are tightened so as to securely affix the mount 40 to the wheeled vehicle WV. In example embodiments, one or more openings 56 are formed in a portion of the fingers 50, and the one or more fasteners F are engageable with the openings 56. In some example embodiments, the openings 56 can be threaded for receiving a fastener F such as a bolt, for example comprising a threaded surface for threaded engagement with the threads formed in the openings 56. According to another example embodiment, one or more threaded nuts can be permanently mounted nearby the openings 56. According to other example embodiments, other fasteners, clips, couplings, or other attachment means can be provided so as to securely affix the mount 40 to the wheeled vehicle WV, for example, to the bracket portion B according to one example embodiment. According to some example embodiments, when the ramps 10 are mounted to the mount 40, the ramps 10 are spaced a distance of between about 12-36 inches from the ground surface G, or for example, the surface that is present below the wheels W of the wheeled vehicle WV. According to one example embodiment, when the ramps 10 are captured by the mount 40, the side of the ramp that is nearest to the ground surface is at least about 10-12 inches above the ground surface, for example about 14-16 inches according to another example, for example about 16-18 inches according to another example embodiment, for example between about 18-20 inches according to another example embodiment, and for example between about 20-36 inches according to another example embodiment. According to some example embodiments, one or more portions of the mount (and/or additional members or mounting portions attached to the mount 40) and be provided so as to provide height adjustability to the ramp-engagement portion 44 so as to provide height adjustment relative to the bracket B of the wheeled vehicle WV.

Referring back to FIGS. 4-5, the engagement fingers 50 of the vehicle-engagement portion 42 comprise a first portion 52 and a second portion 54. In example embodiments, the second portion 54 comprises the one or more openings 56 formed therein for receiving the fasteners F. In example embodiments, the ramp-engagement portion 44 generally comprises at least one upwardly-extending engagement hook or finger 60 for providing engagement with the one or more ramps 10. In example embodiments, the ramp-engagement portion 44 comprises two spaced-apart engagement fingers 60, for example, wherein each engagement finger 60 comprises a first portion 62 and a second portion 64. In example embodiments, the first portions 52, 62 are oriented generally transversely relative to the second portions 54, 64. In example embodiments, the mount 40 comprises at least one vehicle-engagement portion 42 and at least one ramp-engagement portion 44. In example embodiments, a body portion 70 is provided so as to generally affix the vehicle-engagement portion 42 to the ramp-engagement portion 44. According to one example embodiment, the mount 40 comprises about two vehicle-engagement portions 42 and about two ramp-engagement portions 44. For example, according to the depicted example embodiment, a vehicle-engagement portion 42 comprising an engagement finger 50 and a ramp-engagement portion 44 comprising a pair of spaced-apart engagement fingers 60 are spaced apart from another vehicle-engagement portion 42 comprising an engagement finger 50 and a ramp-engagement portion 44 comprising a pair of spaced-apart engagement fingers 60.

Thus, according to example embodiments of the present invention, the mount 40 comprises about two engagement fingers 50 (e.g., for engagement with the wheeled vehicle) and about four engagement fingers 60 (e.g., for engagement with the ramp(s)). As described above, a body portion 70 is provided for generally affixing one of the engagement fingers 50 with the pair of spaced-apart engagement fingers 60, and a pair of spacer members 72 generally extend between the spaced-apart body portions 70 such that the entirety of the mount 40 is generally fixedly coupled together as one integral piece. In some example embodiments, the mount is formed from a steel-like metal material, and the portions and members of the mount 40 can generally be separately formed and welded together to form one integral piece. According to one example embodiment, the mount is formed from 0.1875 inch flat steel bar material. Optionally, one or more portions of the mount can be integral and generally bent to a desired configuration, for example, such that less assembly/welding is needed to form the mount 40. In other example embodiments, one or more other materials including other metals (e.g., aluminum), composites, plastics, natural materials, unnatural materials and/or combinations thereof can be provided for forming the mount. In yet other example embodiments, one or more portions of the mount 40 can be integrally formed by molding. In some example embodiments, the entire mount 40 can be integrally formed in a single mold. In another example embodiment, the mount 40 can be formed from two or more molds and then permanently (or removably) coupled together thereafter.

Still referring to FIGS. 4-5, the mount 40 can preferably be sized and shaped as desired. In preferred example embodiments, the mount 40 is configured so as to be substantially (if not entirely) universal among wheeled vehicles WV, for example, such that regardless of the brand, manufacturer, size, etc. of the wheeled vehicle WV, at least a portion thereof is capable of receiving the vehicle-engagement portions 42, for example, such that the mount 40 is generally affixed to the wheeled vehicle WV and capable of supporting and retaining the ramps 40 thereon. In example embodiments, the length $L_2$ of the mount 40 is generally between about 6-24 inches, for example between about 8-12 inches according to one example embodiment. As depicted in FIG. 5, the mount 40 comprises a height $H_1$ and a width $W_2$. In example embodiments, the height is between about 6-16 inches and the width $W_2$ is between about 4-10 inches. According to one example embodiment, the height $H_1$ is generally about 8 inches and the width $W_2$ is generally about 6 inches.

In example embodiments, the first portion 52 of the engagement finger 50 extends from the body portion 70 a width $W_3$ of about 1-3 inches and the second portion 54 extends from the first portion 52 a height $H_2$ of about 1-3 inches. In example embodiments, the first portion 62 of the engagement finger 60 extend from the body portion a width $W_4$ of about 1-3 inches and the second portion 64 extends from the first portion 62 a height $H_3$ of about 1-3 inches. In example embodiments, the engagement fingers 60 are spaced apart along the body portion and defining a height $H_4$ of about 2-6 inches. According to additional example embodiments of the present invention, the lengths, heights and widths of the ramp(s) 10 and mount 40 can preferably be sized as desired.

As depicted in FIG. 4, the openings 56 are generally sized to comprise a diameter of between about 0.25-0.5 inches. In example embodiments, at least one of the second portions 64 of the engagement fingers 60 comprises an opening 66, for example, such that a strap or fastener can be affixed thereto for generally securing the ramps 10 to the mount 40. In one example embodiment, an end of an elastic cord or bungee member (not shown) is affixed to the opening 60, and the free end thereof can be wrapped around at least a portion of the ramps 40 once mounted to the engagement fingers 60 of the mount.

FIGS. 6-9 show a wheeled vehicle comprising a pair of ramps 100 removably mounted thereto according to another example embodiment of the present invention. In example embodiments, the ramps 100 are generally removably mounted to mounts 140 (see FIG. 8) that are generally fixedly mounted to the rear bracket or bumper B of the wheeled vehicle WV. Thus, according to the depicted embodiment, a single mount 140 is configured to retain a single ramp 100, and thus, two mounts 140 are provided for removably mounting two ramps 100 thereto.

Figure 7:
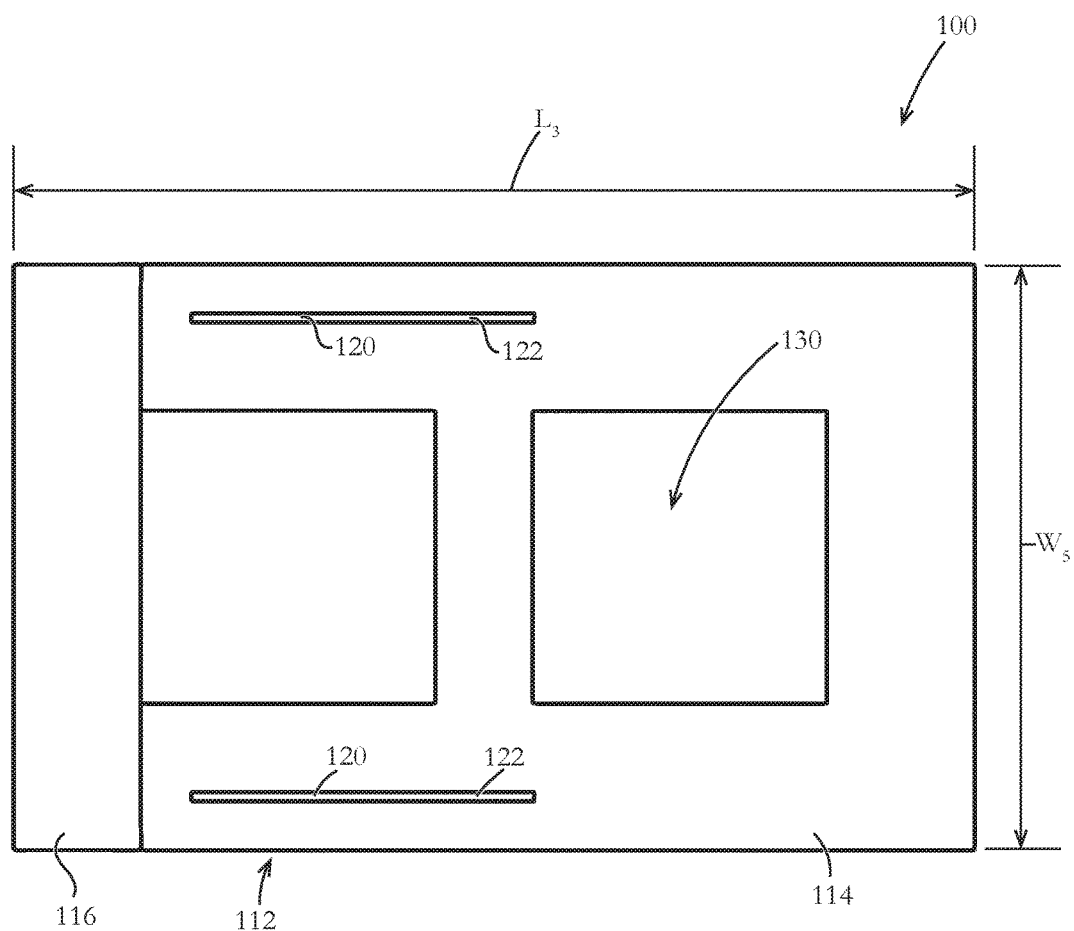
FIG. 7 is a bottom plan view of the at least one ramp of FIG. 6.

As depicted in FIG. 7, the ramp 100 is generally rectangular in shape and comprises a substantially rigid body 112 comprising a main portion 114 and a lip portion 116. In example embodiments, the main portion 114 comprises a pair of engagement fingers 120 that are generally mounted thereto, and offset extensions 122 extend from the engagement fingers 120 so as to provide for engagement with a mount 140 (see FIG. 8) that is intended to be mounted to a portion of the wheeled vehicle WV. According to example embodiments, the ramp 100 comprises a length $L_3$ and a width $W_5$. According to example embodiments, the length $L_3$ is between about 12-26 inches and the width $W_5$ is about 8-16 inches. According to one example embodiment, the length $L_3$ is about 20 inches and the width $W_5$ is about 12 inches. In example embodiments, the engagement fingers 120 comprise a thickness of about 0.1875 inches and are generally spaced about one inch from the sides of the main portion 112 and generally permanently mounted thereto. In example embodiments, the engagement fingers 120 extend about 7 inches in length, and the offset extensions are generally offset about 0.62 inches from a bottom surface of the main portion, for example, such that the offset extensions 122 can be received in portions of a mount 140 (see FIGS. 8-9 as will be described below). According to example embodiments, the lip portion 116 generally extends about 3 inches from an end of the main portion 114 and is generally angled with respect to the main portion at an included angle of between about 95-175 degrees, for example, about 150 degrees according to one example embodiment. According to example embodiments, one or more openings can be formed in the main portion 114 (and/or lip portion 116) so as to reduce the overall weight of the ramp 100 while maintaining its structural integrity. Furthermore, according to example embodiments, one or more portions of the ramp 100 can comprise a layer of expanded sheet metal, which is generally permanently mounted thereto, for example, to provide for frictional engagement with the one or more wheels W of the wheeled vehicle WV. Optionally, other features can be provided on one or more portions of the ramp 100 as desired, for example, to assist in preventing slippage of the wheels and/or to enhance the frictional engagement therewith. According to one example embodiment, the entirety of the top or upper surfaces of the ramps 100 comprise an expanded sheet metal layer permanently mounted thereto, for example, both the main portion 114 and the lip portion 116.

Figure 8:
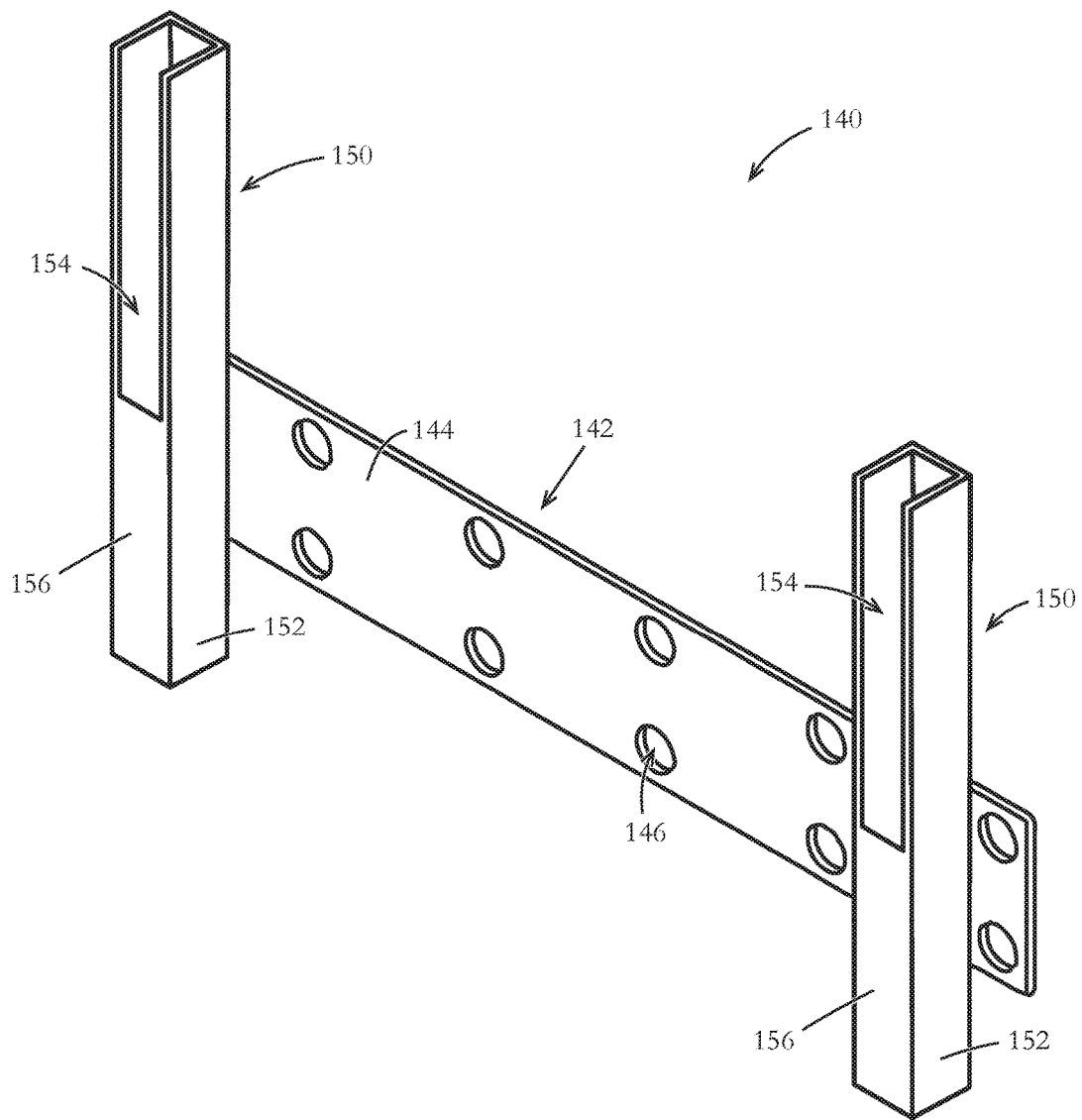
FIG. 8 is a perspective view of a mount for attachment to the wheeled vehicle for removable attachment of the ramps thereto according to another example embodiment of the present invention.

As depicted in FIG. 8, the mount 140 comprises a central body member 142 and a pair of receivers 150 spaced apart from each other and generally permanently mounted to the central body member 142. Optionally, the receivers 150 can be removably mounted to the central body member 142. In example embodiments, the central body member 142 comprises a plurality of openings 146 so as to allow for one or more fasteners to be received therethrough such that the mount 140 can be fastened to the bumper or bracket B of the wheeled vehicle WV. The receivers 150 are generally positioned near the ends of the central body member 142 and comprise a main body portion 152, a receiver slot or notch 154, and a base capture portion 156. In example embodiments, the receivers 150 extend about 7 inches in length and comprise a square cross section comprising 0.75 inch sides that are about 0.625 inches in thickness. The notch 154 comprises a length of about 4 inches and the base capture portion is about 3 inches in length. In example embodiments, the central body member 144 is comprised of 12 gauge steel and the openings defined therein are about 0.50 inches in diameter. In example embodiments, the central body member 144 comprises about 12 openings. In other example embodiments, the central body member 144 need not comprise openings, or for example, can comprise more or less than 12 openings. In some example embodiments, the central body member 144 can be welded to the bracket B of the wheeled vehicle, or for example, one or more self tapping screws or other fasteners, engagement members, clamps, etc. can be provided for attachment of the mounts 140 to the bracket B.

Figure 9:
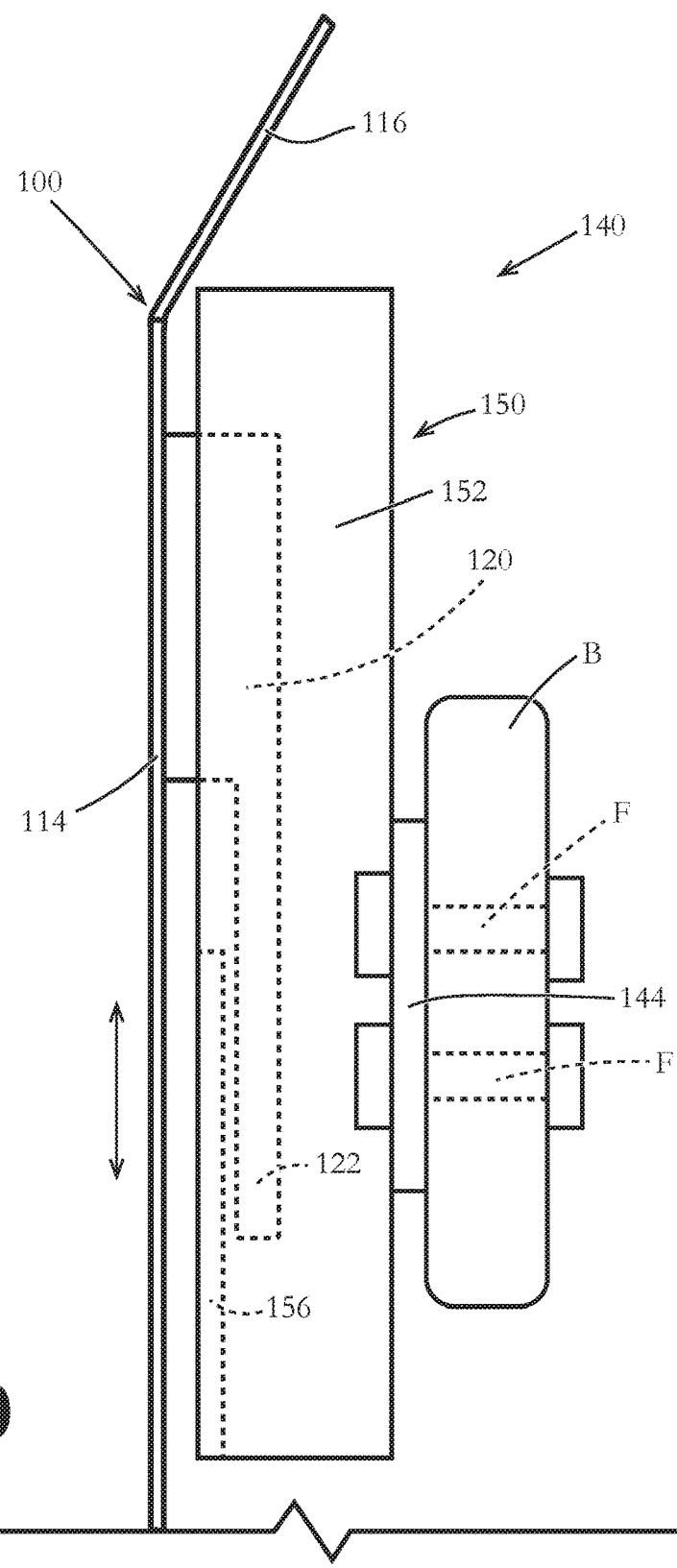
FIG. 9 is a detailed side view of the at least one ramp of FIG. 6 removably engaged with the mount of FIG. 8.

As depicted in FIG. 9, the offset extensions 122 of the engagement fingers 120 are received within the notches 154 of the receivers 150, for example, such that the offset extensions 122 are positioned therein and generally adjacent the base capture portions 156. Thus, the ramp 140 is preferably removably mounted to the mount 140 where the offset extensions 122 of the engagement fingers 120 are retained therein by the base capture portions 156. Thus, the weight of the ramp 100 preferably retains the engagement fingers 120 within the receivers 150 such that manually lifting the ramps upwards (see arrow) can allow for disengagement. Likewise, lowering the ramp 100 towards the receivers 140 allows for engagement therebetween. According to some example embodiments, one or more elastic cords or bungee straps can be provided so as to removably fasten the ramp 100 to the mount.

Figure 10:
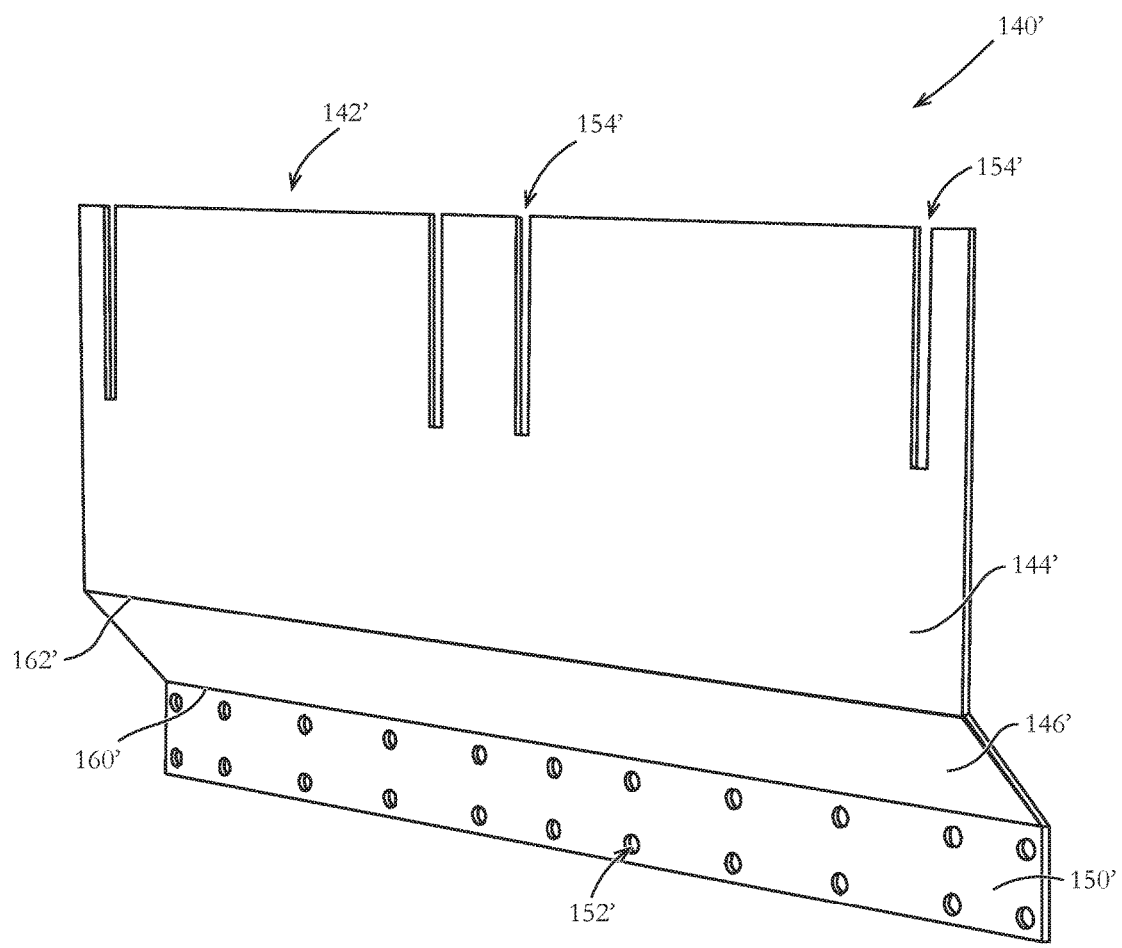
FIG. 10 is a perspective view of a mount for attachment to the wheeled vehicle for removable attachment of the ramps thereto according to another example embodiment of the present invention.

FIG. 10 shows a mount 140' according to another example embodiment of the present invention. As depicted, the mount 140' is generally integrally formed together and comprises a main body portion 142' having a upper body portion 144', a transitional portion 146' and a mounting portion 150'. In example embodiments, the upper body portion 144' comprises a plurality of spaced-apart slots 154' for receiving the engagement fingers 120 of the ramps 100, for example, such that a pair of ramps 100 can be removably engaged with the upper body portion 144' of the mount 140'. In example embodiments, the mounting portion 150' is intended to be attached to the bracket B of the wheeled vehicle WV and can optionally comprises one or more openings 152' for receiving fasteners F. According to example embodiments, the transitional portion 146' is provided between the upper body portion 142' and the mounting portion 150' so as to allow for the upper body portion 144' to be generally offset from the mounting portion 150'. In example embodiments, a bend or fold is provided in the main body portion 142' to define the portions of the mount. For example, a first bend 160' is provided between the mounting portion 150' and the transitional portion 146', and a second bend 162' is provided between the transitional portion 146' and the upper body portion 144'. In example embodiments, the transitional portion 146' is generally angled about 45 degrees relative to both the upper body portion 144' and the mounting portion 150'. Optionally, the transitional portion 146' can be angled with respect to the upper body portion 144' and the mounting portion 150' as desired.

Figure 13:
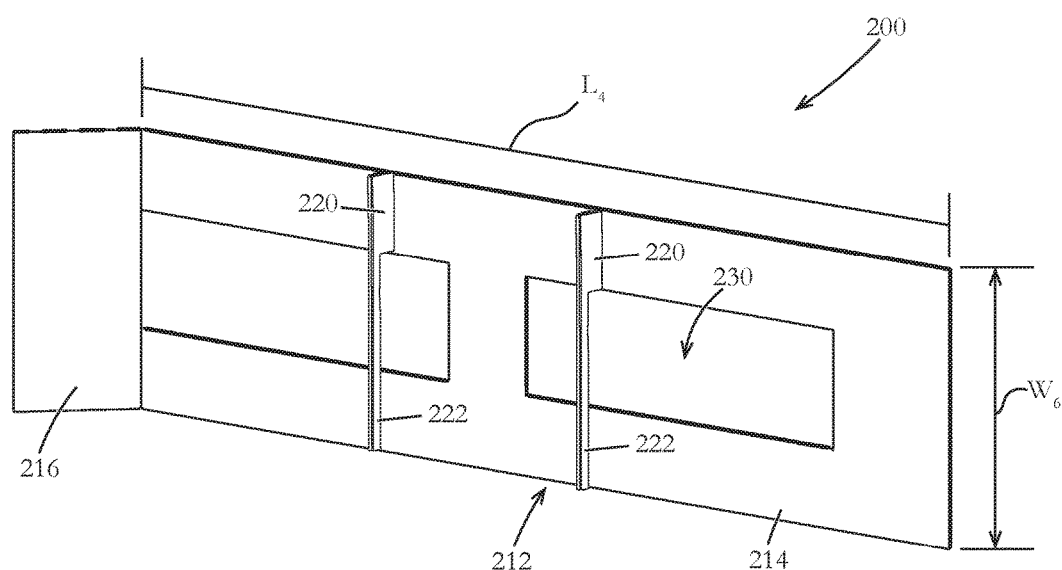
FIG. 13 is a bottom perspective view of the at least one ramp of FIG. 11.

FIGS. 11-14 show another example embodiment of the present invention. According to some example embodiments, the wheeled vehicle WV comprises an alternate configuration, for example, a walk-behind type wheeled vehicle WV (e.g., walk-behind lawn mower) comprising a front-mounted deck D and deck frame DF that is supporting the deck D. In example embodiments, the deck frame DF can comprise a mount 240 secured thereto such that one or more ramps 200 can be removably engaged with the mount 240 that is secured to the deck frame DF. For example, as similarly described with respect to FIGS. 6-9, each ramp 200 comprises a pair of spaced-apart engagement fingers 220 for removable engagement with pairs of spaced apart receivers 250 of the mount. For example, as depicted in FIG. 13, the ramp 200 is generally similar to the ramp 100 as described above. In example embodiments, the ramp 200 comprises a generally rigid and rectangular-shaped body 212 comprising a main portion 214 and a lip portion 216. In example embodiments, the main portion 214 comprises a pair of engagement fingers 220 that are generally mounted thereto, and offset extensions 222 extend from the engagement fingers 220 so as to provide for engagement with the receivers 250 of the mount 240 (see FIG. 14). According to example embodiments, the ramp 200 comprises a length $L_4$ and a width $W_6$. According to example embodiments, the length $L_4$ is between about 12-30 inches and the width $W_6$ is about 4-16 inches. According to one example embodiment, the length $L_4$ is about 24 inches and the width $W_6$ is about 7 inches. In example embodiments, the engagement fingers 220 comprise a thickness of about 0.1875 inches and are generally oriented to extend transversely relative to the extension of the main portion 214. In example embodiments, the engagement fingers 220 extend about 7 inches in length, and the offset extensions 222 are generally offset about 0.62 inches from a bottom surface of the main portion, for example, such that the offset extensions 222 can be received in the notches 254 of the receivers 250. According to example embodiments, the lip portion 216 generally extends about 3 inches from an end of the main portion 214 and is generally angled with respect to the main portion at an included angle of between about 95-175 degrees, for example, about 150 degrees according to one example embodiment. According to example embodiments, one or more openings 230 can be formed in the main portion 214 (and/or lip portion 216) so as to reduce the overall weight of the ramp 200 while maintaining its structural integrity. Furthermore, according to example embodiments, one or more portions of the ramp 200 can comprise a layer of expanded sheet metal, which is generally permanently mounted thereto, for example, to provide for frictional engagement with the one or more wheels W of the wheeled vehicle WV. Optionally, other features can be provided on one or more portions of the ramp 200 as desired, for example, to assist in preventing slippage of the wheels and/or to enhance the frictional engagement therewith. According to one example embodiment, the entirety of the top or upper surfaces of the ramps 200 comprise an expanded sheet metal layer permanently mounted thereto, for example, both the main portion 214 and the lip portion 216.

Figure 14:
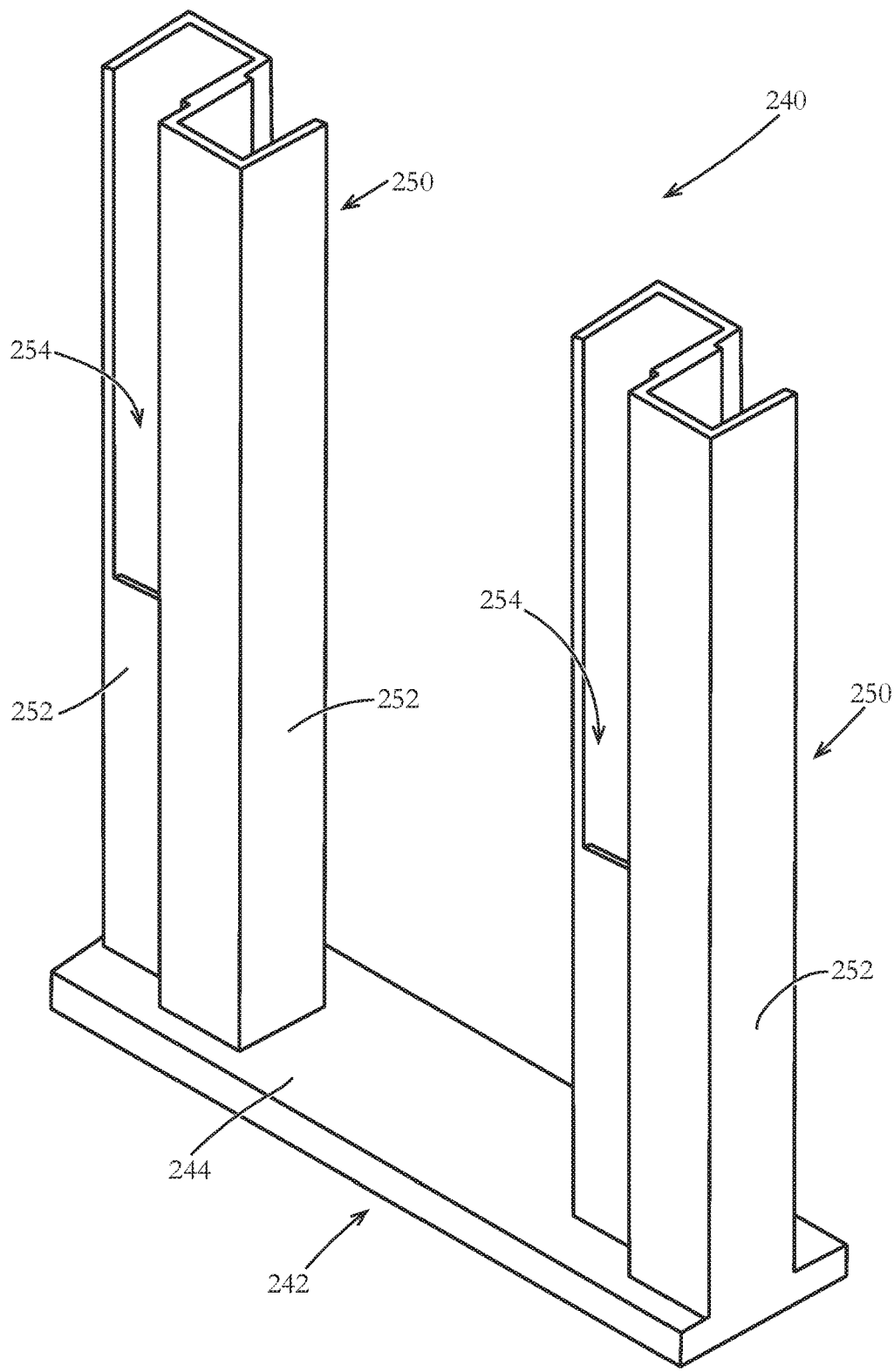
FIG. 14 is a perspective view of a mount for attachment to the wheeled vehicle for removable attachment of the ramps thereto according to another example embodiment of the present invention.

As depicted in FIG. 14, the mount 240 comprises pairs of oppositely-oriented receivers 250 that are spaced-apart on a main body portion 244 of a central base member 242. In example embodiments, two of the receivers 250 comprise the notches 254 facing a first direction, and the other two receivers 250 comprise notches 254 facing a second, generally opposite direction. Thus, according to example embodiments, the mount 240 is configured for receiving the engagement fingers 220 of a pair of ramps (e.g., two ramps), for example, wherein one of the ramps 200 is positioned on a first side of the mount such that the engagement fingers 220 engage with the notches 254 facing the first direction and the other ramp 200 is positioned on the second side of the mount such that the engagement fingers 220 engage with the notches 254 facing the second direction (see FIGS. 11-12). According to example embodiments, the main body portion 244 of the central base member 242 is preferably mounted to the deck frame DF, or for example, a portion of the wheeled vehicle WV. In example embodiments, a pair of fasteners F such as u-bolts are configured to wrap around the main body portion 244 and secure the same to the deck frame DF. Optionally, at least a portion of the count can be welded to the deck frame DF, or for example, one or more other fasteners, clamps, or other coupling members and/or components or devices can be provided as desired so as to secure the mount 240 to at least a portion of the wheeled vehicle WV, for example, the deck frame DF according to one example embodiment.

In example embodiments, the ramps 10 are generally formed from aluminum and the mount 40 is generally formed from steel. In some example embodiments, the mount 40 is formed from one or more aluminum pieces or members. Optionally, the ramps 10 and the mount 40 can be formed from one or more materials as desired, for example, steel, aluminum, other metals, composites, plastics, wood, natural materials, unnatural materials and/or combinations thereof. Furthermore, the ramps 100, 200 and mounts 140, 140' and 240 and likewise be formed from one or more materials as desired, for example, steel, aluminum, other metals, composites, plastics, wood, natural materials, unnatural materials and/or combinations thereof. According to some example embodiments, the one or more components that may form a ramp or mount as described herein are generally welded together. However, one or more fasteners are provided for securing the mount to the bracket B of the wheeled vehicle WV. According to other example embodiments, one or more components that may form a ramp or mount as described herein can be generally integrally formed together, for example, in a casting or other mold, for example, whether formed from a metal, plastic, composite, etc.

According to another example embodiment, the present invention relates to a method of traversing a curb with user-accessible ramp system. The method comprises providing a wheeled vehicle; providing a mount; providing at least one ramp; removably attaching the mount to the wheeled vehicle; removably attaching the at least one ramp to the mount, moving the wheeled vehicle WV near a curb, removing the at least one ramp from the mount and setting it between an upper portion of the curb and a ground surface; and moving the wheeled vehicle atop and across the ramp such that the wheeled vehicle WV traverses the curb C.

Figure 11:
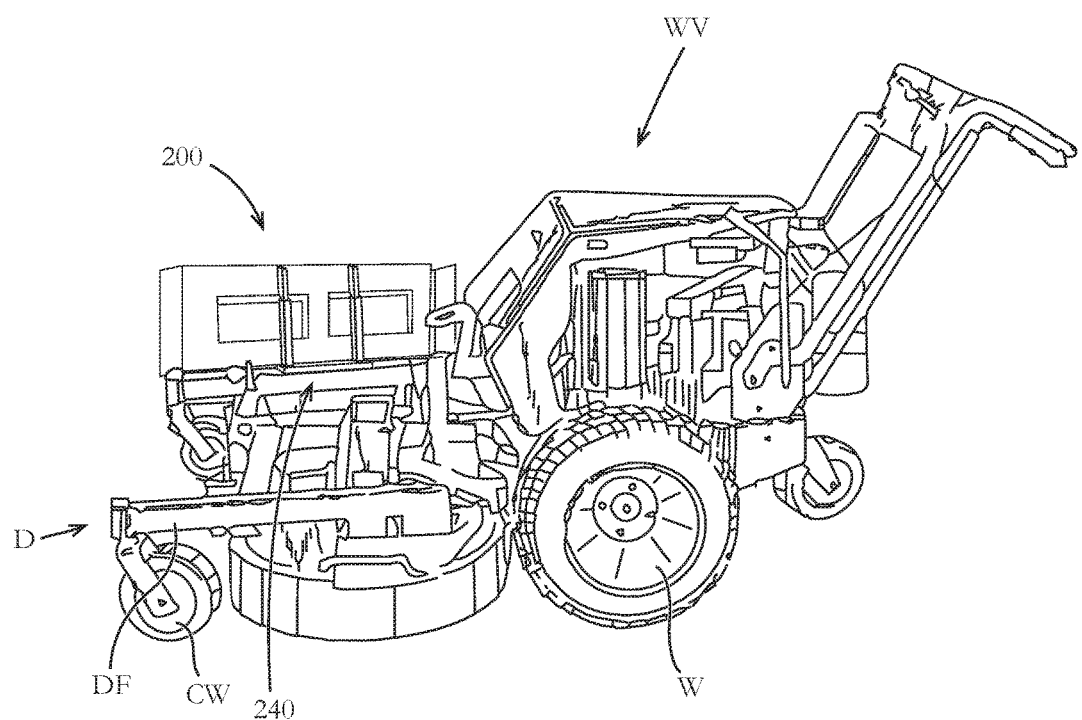
FIG. 11 is a perspective view of a wheeled vehicle comprising at least one ramp removably mounted thereto according to another example embodiment of the present invention.
Figure 12:
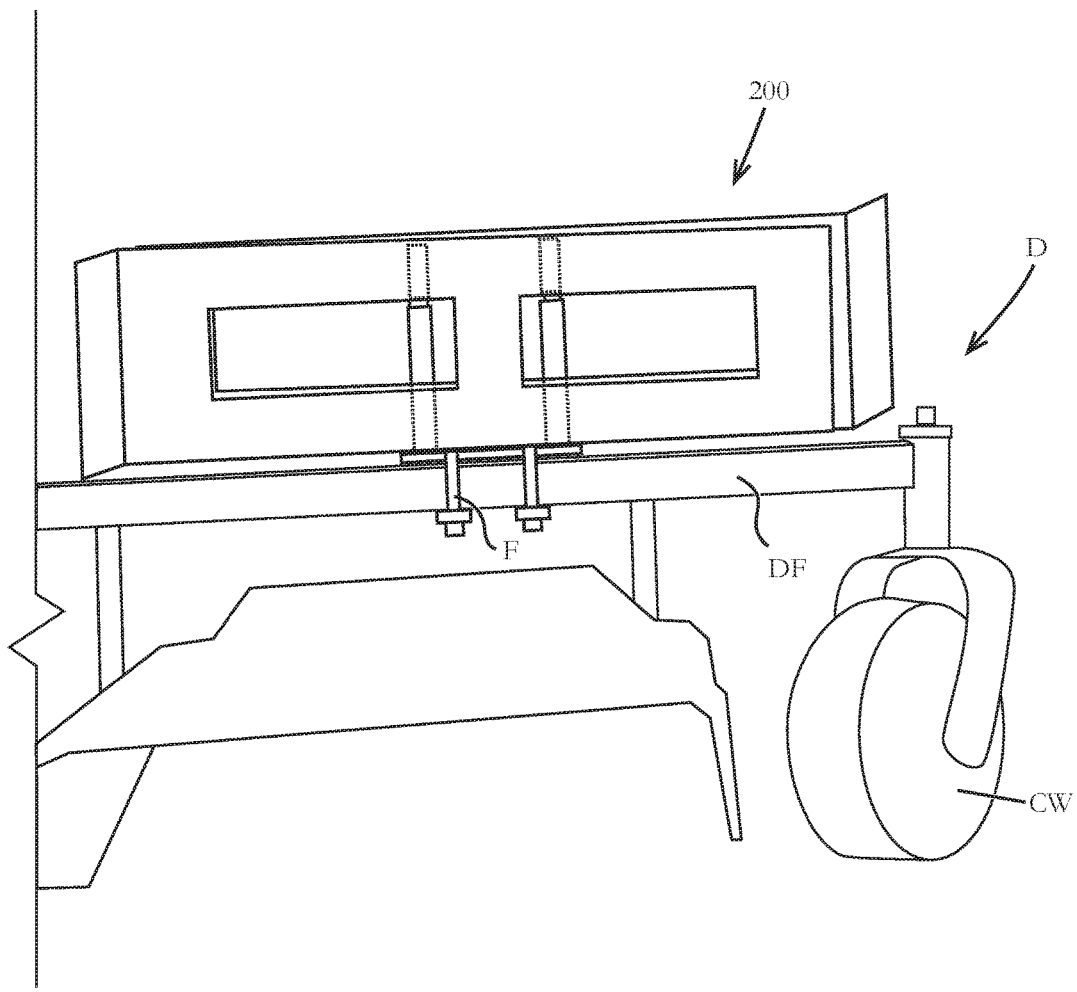
FIG. 12 is a side perspective view of the wheeled vehicle and at least one ramp mounted thereto of FIG. 11.

According to another example embodiment of the present invention, one or more of the mounts can be configured for mounting to one or more other portions of the wheeled vehicle. For example, according one example embodiment, the mount 40 can be configured for mounting to a front-facing bracket, shield, engine/motor shield, handle, deck access plate or other portions of the wheeled vehicle WV. For example, as depicted in FIG. 11, one or more portions of the wheeled vehicle WV, for example, generally between the front caster wheels of the deck D and the two larger driving wheels W, can comprise a portion suitable/adaptable for receiving the vehicle-engagement portion 42. According to one example embodiment, the wheeled vehicle comprises a Toro® Grandstand® lawn mower, and a pivotable deck access plate or panel (e.g., generally vertically-extending and above a deck thereof for allowing easy access to belt and pulleys) can be configured for affixing (permanently or removably) the mount thereto. According to some example embodiments, one or more dimensions of the mount can be adjusted, for example, to generally comprise smaller and more adaptive dimensions so as to mount to one or more portions of the wheeled vehicle WV as desired. According to one example embodiment and in reference to the mount 40 of FIGS. 4-5, the length $L_2$ of the mount can be about 8 inches, the height $H_1$ can be about 8 inches, the height $H_2$ can be about 1.5 inches, and the width $W_2$ can be about 6.38 inches. Optionally, according to additional example embodiments of the present invention, one or more dimensions of the mount 40 can be chosen as desired.

According to additional example embodiments of the present invention, one or more ramps as disclosed herein can preferably mount to a wheeled vehicle as desired. According to one example embodiment, the mount comprises at least one engagement portion for attachment to the wheeled vehicle and at least one engagement portion for attachment to one or more ramps. In some example embodiments, the ramp can be reconfigurable between an expanded configuration and a collapsible configuration. For example, according to example embodiments, the ramps is intended to be in the collapsed configuration when attached to the wheeled vehicle (or attached to the mount that is attached to the wheeled vehicle) and an expanded configuration when placed against the curb C. According to one example embodiment, the ramp in the collapsed configuration is dimensioned to be substantially similar to the length $L_1$ and width $W_1$ of the ramp 10, and wherein in the expanded configuration the ramp extends between about 32-48 inches so as to accommodate a wheel width or footprint of the wheeled vehicle. In some example embodiments, one or more hooks, engagement fingers, tabs, hangers, or other engagement members can be mounted to the wheeled vehicle as desired, for example, so as to allow for removable attachment of the ramps thereto. In some example embodiments, the ramp can comprise one or more engagement portions so at to be removably engageable with one or more portions of the wheeled vehicle. In other example embodiments, one or more straps, ropes, tethers, cables, or other connectors or fasteners can be provided such that the ramps can be removably mounted to the wheeled vehicle.

While the invention has been described with reference to example embodiments, it will be understood by those skilled in the art that a variety of modifications, additions and deletions are within the scope of the invention, as defined by the following claims.

What is claimed is:

1. A ramp and mount system comprising:
   at least one ramp; and
   a mount comprising a vehicle-engagement portion and a ramp-engagement portion, wherein the vehicle-engagement portion is removably attached to a bracket of a wheeled vehicle and the at least one ramp is configured for removable engagement with the ramp-engagement portion, wherein the vehicle-engagement portion comprises a pair of spaced-apart engagement fingers for removable engagement with a portion of the wheeled vehicle.

2. The ramp and mount system of claim 1, wherein a pair of ramps are configured for removable engagement with the ramp-engagement portion.

3. The ramp and mount system of claim 1, wherein at least a portion of the vehicle-engagement portion is configured for receiving at least one fastener for removable engagement of the vehicle-engagement portion with at least a portion of the wheeled vehicle.

4. The ramp and mount system of claim 1, wherein the mount is configured for removably attachment to a bracket or bumper portion of the wheeled vehicle.

5. The ramp and mount system of claim 1, further comprising one or more elastic cords for removably securing the at least one ramp to the mount.

6. The ramp and mount system of claim 1, wherein the at least one ramp and mount are formed from a steel or aluminum material.

7. The ramp and mount system of claim 1, further comprising a body portion for generally affixing the vehicle-engagement portion to the ramp-engagement portion.

8. The ramp and mount system of claim 7, further comprising at least one spacer member for affixing the body portion comprising a first vehicle-engagement portion and first vehicle-engagement portion with another body portion comprising a second vehicle-engagement portion and a second ramp-engagement portion.

9. The ramp and mount system of claim 1, wherein the ramp-engagement portion comprises at least one engagement finger.

10. The ramp and mount system of claim 9, wherein the ramp-engagement portion comprises a pair of spaced-apart engagement fingers.

11. A mount for receiving and retaining at least one ramp, the mount comprising:
    a first side comprising a body portion, at least one engagement finger extending in a first direction and at least one engagement finger extending in a second direction;
    a second side comprising a body portion, at least one engagement finger extending in the first direction and at least one engagement finger extending in a second direction; and
    at least one spacer member coupled to the body portion of the first and second side so as to provide at least some spacing between the first side and the second side.

12. The mount of claim 11, wherein the first side comprises at least two engagement fingers extending in the second direction and wherein the second side comprises at least two engagement fingers extending in the second direction.

13. The mount of claim 11, wherein the first and second body portions and the engagement fingers comprise aluminum.

14. The mount of claim 11, wherein the engagement fingers extending in the second direction are configured for receiving and removably retaining one or more ramps.

15. The mount of claim 11, wherein the first and second body portions and the engagement fingers comprise steel.

16. The mount of claim 11, wherein the engagement fingers of the first and second sides that extend in the first direction are configured attachment to at least a portion of a wheeled vehicle.

17. The mount of claim 16, wherein the wheeled vehicle comprises a lawn mower.

18. A mount for removably receiving at least one ramp comprising:
- a central base member;
- a first pair of receivers extending from the central base member, wherein one of the receivers faces a first direction and another one of the receivers facing a second direction;
- a second pair of receivers extending from the central base member, wherein one of the receivers faces the first direction and another one of the receivers facing the second direction,
- wherein at least one receiver of the first and second pairs of receivers comprise a notch formed within at least a portion thereof, wherein the at least one notch is configured for receiving an engagement finger of the at least one ramp.

19. The mount of claim 18, wherein the central base member is configured for mounting to a deck frame of a wheeled vehicle.

20. The mount of claim 19, wherein the wheeled vehicle comprises a walk-behind lawn mower comprising a front-mounted deck supported by the deck frame.

21. A mount for receiving and retaining at least one ramp, the mount comprising a first body portion and a second body portion, the first body portion comprising at least one vehicle-engagement portion and at least one ramp-engagement portion, the second body portion comprising at least one vehicle-engagement portion and at least one ramp-engagement portion, wherein the at least one vehicle-engagement portion is configured for attachment to a bracket of a wheeled vehicle and the at least one ramp-engagement portion is configured for removably engaging at least one ramp thereto, and wherein the at least one vehicle-engagement portion comprises at least one engagement finger and wherein the at least one ramp-engagement portion comprises a pair of spaced-apart engagement fingers, the at least one engagement finger of the at least one vehicle-engagement portion extending in a first direction and the pair of spaced-apart engagement fingers of the at least one ramp-engagement portion extending in a second direction.

* * * * *